United States Patent [19]

Engira

[11] Patent Number: 5,431,575
[45] Date of Patent: Jul. 11, 1995

[54] BI-DIRECTIONAL BATTERY HOLDER

[75] Inventor: Ram M. Engira, Milwaukee, Wis.

[73] Assignee: Cardiac Evaluation Center, Inc., Milwaukee, Wis.

[21] Appl. No.: 198,736

[22] Filed: Feb. 18, 1994

[51] Int. Cl.6 .................... H01R 27/00; H01R 3/00
[52] U.S. Cl. ................................ 439/218; 429/99; 429/100; 439/500
[58] Field of Search ........... 439/500, 217, 218, 919; 429/123, 100, 99, 96

[56] References Cited

U.S. PATENT DOCUMENTS

| | | | |
|---|---|---|---|
| 3,178,317 | 4/1965 | Maddaloni | 429/99 |
| 3,887,393 | 6/1975 | La Rue, Jr. | 429/99 |
| 4,510,215 | 4/1985 | Adam | 429/99 |
| 4,969,206 | 11/1990 | Desrochers | 455/89 |
| 5,015,546 | 5/1991 | Dulaney et al. | 429/99 |
| 5,211,579 | 5/1993 | Seong et al. | 439/500 |
| 5,229,220 | 7/1993 | Stanton et al. | 429/1 |

Primary Examiner—P. Austin Bradley
Assistant Examiner—Jeffrey T. Knapp
Attorney, Agent, or Firm—Quarales & Brady

[57] ABSTRACT

A battery holder for axial-type dry cells, alkaline or other, has opposed faces for abutting either terminal of the battery and supporting two conductors, a center conductor contacting only the positive terminal of the battery and a flanking outer conductor contacting only the negative terminal of the battery depending on which terminal of the battery abuts the inner face. Center conductors are joined by a wire as are the flanking outer conductors so that the battery provides a single polarity of voltage through the wires regardless of the direction of its insertion within the battery holder. The center conductor is recessed within a groove to stabilize the battery and to prevent shorting of the different conductors by the battery terminals.

7 Claims, 4 Drawing Sheets

BI-DIRECTIONAL BATTERY HOLDER

FIELD OF THE INVENTION

This invention relates to battery holders that provide electrical connection to axial-type dry cell and alkaline batteries commonly identified as 'AA', 'AAA', 'C', or 'D' type batteries, and in particular, to a battery holder that permits the battery to be inserted in either of two directions without loss of power or reversal of polarity of the voltage supply.

Background of the Invention

The carbon-zinc dry cell, employing a cathode mix of manganese dioxide and a zinc anode, achieved early popularity as a cylindrical package in which a central carbon electrode, in the form of a rod, was surrounded by the cathode mix and held within a cylindrical zinc can. The bottom of the zinc can, abutting a generally planar disk of metal, formed the negative terminal of the cell and one end of the central carbon rod, capped by a metal button whose inner surface grasped the carbon rod, formed the positive terminal of the cell. The resulting two battery terminals were thus at opposite bases of the cylindrical package and generally aligned in along the axis of the cylindrical package.

This package, which will henceforth be termed "axial", now finds use in a number of different types of cells other than the zinc carbon cell, including alkaline as well nickel cadmium and lithium cells. Such axial cells come in a variety of sizes typically designated by different letters of the alphabet (e.g. AA, A, C, and D) and which differ in either or both of diameter and height. Each of these axial cells shares the characteristic that the positive terminal includes a centrally protruding button whereas the negative terminal has a substantially planar surface extending by a diameter substantially greater than that of the button.

In technical usage, a battery is more than one electrochemical cell in a package, however, the term "battery" as used henceforth, should be understood to include either multiple or single cells per common usage.

An early use of axial batteries was in flashlights. Here, ensuring the proper polarity of the installed batteries is of little concern. If the batteries are installed incorrectly, so that the light does not operate, the simplicity of the device makes the source of the problem evident. There is little risk of reversed batteries damaging the flashlight.

In contrast, present day low-powered integrated circuits are extremely sensitive to the polarity of the applied voltage. Even a momentary reversal of polarity (reverse biasing), caused by a reversed connection of the batteries for example, can destroy such devices. When complex or expensive electronic equipment is battery powered, any possibility of the equipment being subject to even an inadvertent reversal of supply voltage must be eliminated.

For this reason, it is known to construct battery holders for axial batteries in which the battery holder's connector to the positive terminal of the battery is placed in a recess having a diameter substantially equal to that of the conductive button of the positive terminal of the battery. In this way, if the battery is installed "backwards" so that its negative terminal is, in fact, adjacent to the positive connector of the battery holder, no contact will be made because the terminal of the battery will be too big to fit within the recess and make contact with the recessed connector.

Unfortunately, although the battery holder protects the circuit from reverse biasing, no power is provided to the circuit when the batteries are installed backwards. In devices that do not visually or audibly indicate that they are receiving power, the failure of the device to operate because of incorrectly installed batteries may not be detected until too late. This is particularly unacceptable in cases where the battery operated device is a patient monitoring device that must work reliably to ensure capture of life threatening arrhythmias, for example. Human errors in inserting batteries incorrectly in such cases are likely because of the reduced alertness of the patient. The use of a pilot light or the like may not be practical because it may significantly decrease the operating life of the batteries.

Even if the failure of the battery powered equipment to operate is readily recognized, the complexity of the equipment may lead the user of the equipment to the conclusion that the circuitry itself has malfunctioned, leading to wasted effort in diagnosing and servicing the equipment.

It is possible to provide a single polarity of supply voltage to a circuit, regardless of direction in which the batteries are installed, by using a diode bridge. However, a diode bridge introduces a significant voltage drop between the batteries and the circuit that may be unacceptable for low voltage circuits using one or two cells. Voltage drop across protection diodes also result in significant reduction of the useful battery life.

Importantly, if multiple batteries are used, diode bridges cannot practically correct for the situation where only some of the batteries are installed backwards.

SUMMARY OF THE INVENTION

The present invention provides a simple battery holder for axial type batteries that provides a single polarity of electrical voltage to attached circuitry regardless of the direction in which the batteries are inserted.

Specifically, the holder includes a frame having contact plates attached at either end to present opposed faces separated by the length of the battery. An axial type battery having a conductive button on one terminal and a planar plate on the other terminal, may fit between the opposed faces so that its terminals are next to the opposed faces. A first and second conductor are exposed, one on each opposed face, to contact the conductive button of the battery, if the button is adjacent to a face. A third and fourth conductor, insulated from the first and second conductor, are exposed, one on each face and aside either the first and second conductor, to extend further from opposed faces than the first or second conductors and to contact the conductive plate of the battery, if the conductive plate is adjacent to a face.

Thus, it is one object of the invention to eliminate the need for the user of a battery powered product to determine the proper direction for the insertion of any axial-type cell. The symmetrical arrangement of the electrodes on either face make the direction of insertion irrelevant. The displacement of the first and second electrodes with respect to the second and third electrodes insures that the first and second electrodes will only be contacted by the protruding button conductor of the battery while the third and fourth electrodes will preferentially contact the conductive plate of the negative terminal of the battery.

The first and second conductors may be joined to provide a first polarity of electrical voltage and the third and fourth conductors may be joined to provide a second and opposite polarity of electrical voltage.

It is another object of the invention to provide a single polarity of voltage regardless of the insertion direction of the axial-type cell without the need for diodes which introduce voltage drops limiting the available voltage from the inserted cells. Connecting the conductors as described provides points of constant polarity voltage regardless of the insertion direction of the battery.

Accordingly, it is a further object of the invention to provide a battery holder that not only prevents an incorrect insertion of an axial-type cell from damaging sensitive circuitry but also that insures that such incorrect insertion does not simply block electrical flow from the battery to the circuitry such as might lead a user to conclude that the circuitry was not functioning.

The opposed faces may include recesses sized to admit the conductive button of the battery but not the conductive plate and the first and second conductors may be placed within the recesses.

It is thus another object of the invention to provide a means of aligning the cell within the battery holder to prevent shorting between the first and second conductors and the third and fourth conductors by the flat negative conductor of the battery.

The foregoing and other objects and advantages of the invention will appear from the following description. In the description, reference is made to the accompanying drawings which form a part hereof and in which there is shown by way of illustration, a preferred embodiment of the invention. Such embodiment does not necessarily represent the full scope of the invention, however, and reference must be made therefore to the claims herein for interpreting the scope of the invention.

DETAILED DESCRIPTION OF THE PREFERRED EMBODIMENT

Figure 1:
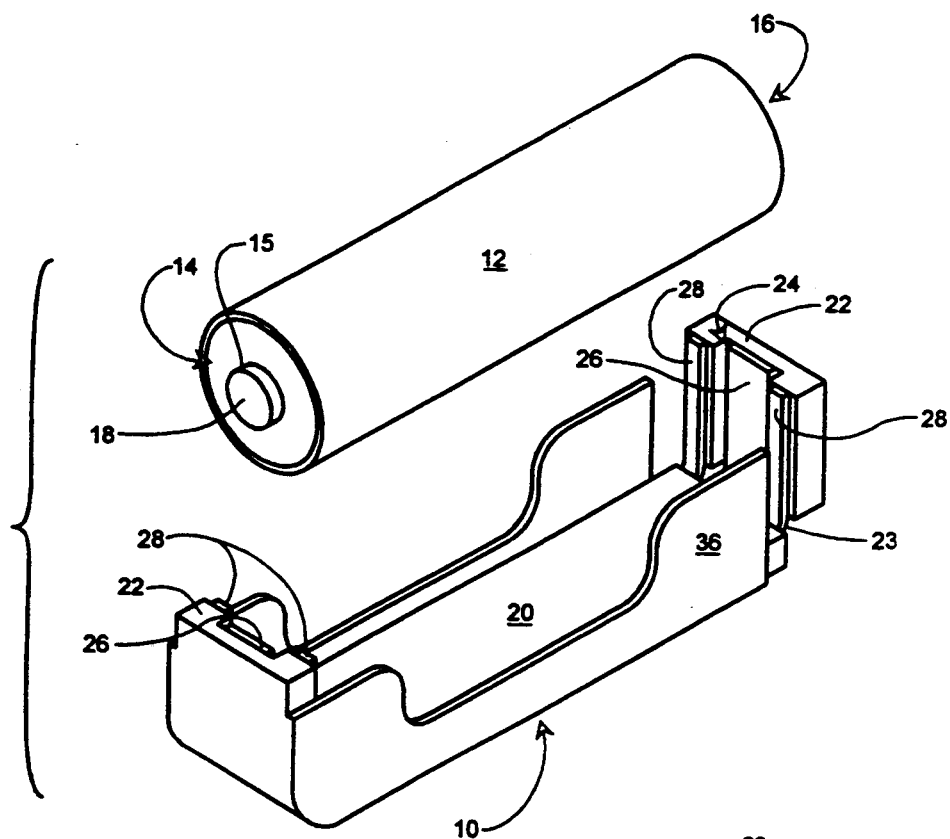
FIG. 1 is a perspective exploded view of an axial-type battery and a battery holder of the present invention showing the symmetrical contact plates of the battery holder such as provides reversibility.
Figure 2:
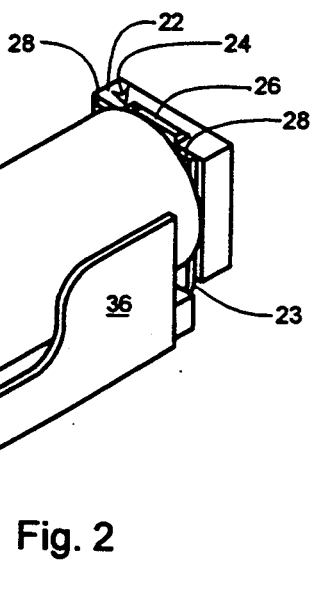
FIG. 2 is a figure similar to that of FIG. 1 showing the axial-type battery in position in the battery holder of the present invention.

Referring to FIG. 1, a battery holder 10 of the present invention may receive an axial-type battery 12.

As described above, such axial-type batteries 12 are generally cylindrical and have a positive battery terminal 14 and negative battery terminal 16 opposed along the battery's axis at the two bases of a cylinder forming the body of the battery 12. The negative battery terminal 16 is generally a planar conductive plate of radius nearly equal to that of the body of the battery 12 whereas the positive battery terminal 14 includes a conductive button 18 having a radius substantially less than that of the body of the battery 12. The conductive button 18 is centered about the axis of the battery 12 and protrudes from the end of the battery 12 by a distance 15.

The battery holder 10 includes a frame 20 extending longitudinally by substantially the length of body of the battery 12 between its terminals 14 and 16. The frame 20 is terminated at its longitudinal ends by a first and second contact plate 22 extending transversely upward from the frame 20. The frame 20 and the contact plates 22 are preferably molded from a nonconductive plastic or the like.

At least one of the contact plates 22 is attached to the frame 20 by means of leaf springs 23 (to be described below) and that provide axial force on the battery 12 to hold battery 12 in position and that provide good electrical connection between contact plates 22 and battery terminals 14 and 16.

The height of the contact plates 22 and their separation along the frame 20 is such as to define a battery space that will receive the battery 12 with the positive terminal 14 adjacent to the inner face of one contact plate 22 and the negative terminal 16 adjacent to the inner face of the other contact plate 22. The battery 12 will fit within the battery space in either of two positions differing from each other only by a rotation of the axis of the battery by 180°.

The inner faces of the contact plates 22 incorporate rectangular slots 24 extending transversely along the inner faces of the contact plates 22 upward from the frame 20 so as to provide passage for the conductive button 18 of the battery 12 when the battery 12 is inserted into the battery holder 10 in either of the two positions.

An electrical conductor 26 fits within each rectangular slot 24 so that the conductor 26 abuts that vertical surface of each slot 24 generally parallel to the inner face of the contact plates 22. The conductors 26, so positioned, may contact only the conductive button 18 of the positive terminal 14 when that button is received with the slot 24 associated with that conductor 26.

Flanking the slots 24, and abutting the inner face of each contact plate 22 are further conductors 28, electrically isolated from conductors 26, which contact only the planar negative terminal 16 of the battery 12 when the battery 12 is in position within the battery holder 10. The conductors 28 for one contact plate 22 bend at right angles at their lower end to attach to the frame 20 and to form the leaf springs 23 providing the axial biasing of the contact plate as described above.

Figure 3:
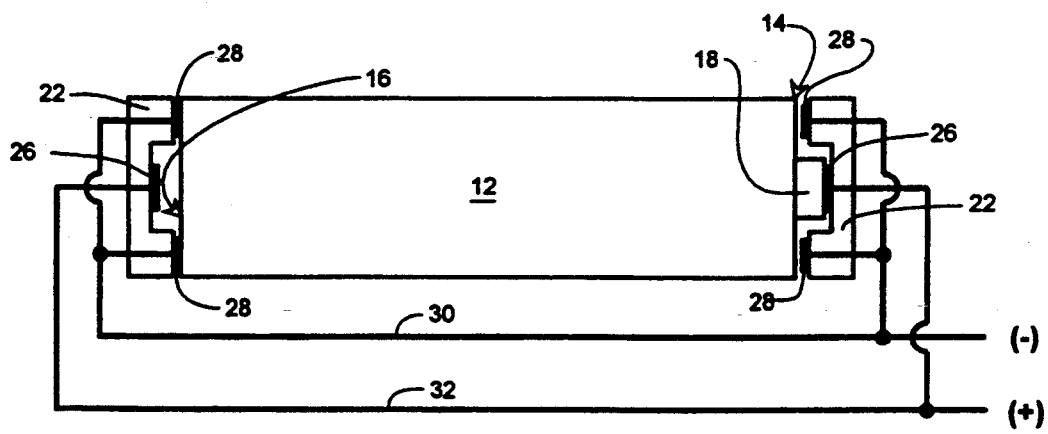
FIG. 3 is a schematic plan view of the battery holder and battery of FIGS. 1 and 2 showing the connections of conductors on the battery holder such as to provide a single polarity of voltage from batteries inserted in either of two directions.

Referring now to FIGS. 1 and 3, the longitudinal depth of the slot 24, and the longitudinal offset of the conductors 26 from the conductors 28 on each contact plate 22, is such that the distance 15 of the conductive button 18 holds the remainder of the positive battery terminal 14 away from the conductors 28 which otherwise would touch the outer rim of the positive battery terminal. This prevents a possible shorting of conductors 26 to conductors 28.

Thus, when the positive terminal 14 of the battery is near a first contact plate 22, the conductive button 18 will contact conductor 26 of the contact plate 22 and conductors 28 of that contact plate 22 will be held away from the terminal 14 by the physical extent of the conductive button 18. On the other hand, the negative terminal 16 having no conductive button 18 will contact the conductors 28 at the other contact plate 22, but conductor 26 of that contact plate 22 will not touch the negative terminal 16 because it is recessed within the slot 24. If the battery 12 is reversed in position with the positions of the negative and positive terminals 16 and 14 exchanged, the mirror symmetry of the conductors 28 and 26 and slots 24 will provide that the conductive button 18 will contact the conductor 26 on the other contact plate 22 and the planar negative terminal 16 will contact the conductors 28 at the other contact plate 22.

Conductors 28 on both contact plates 22 are connected together via a wire 30 which provides a negative polarity of electrical voltage to any attached equipment. Likewise, conductors 26 on both contact plates 22 are connected together by a wire 32 which provides a positive polarity of electrical voltage to the attached equipment.

It will be understood, therefore, that no position of battery 12 in the battery holder 10 will allow wire 32 to provide a negative polarity of voltage or wire 30 to provide positive polarity of voltage such as would reverse bias attached circuitry. Further, in both positions of the battery 12 within the battery holder 10, electrical voltage will be present on wires 30 and 32.

Thus the present invention avoids the problem of polarized battery holders that do not provide any electrical power if the battery is inserted in the wrong direction. Importantly, this ability of the present invention to supply power of the proper polarity when the battery 12 is in either of two positions, requires no commutation diodes and thus creates no wasteful voltage drop.

Figure 5:
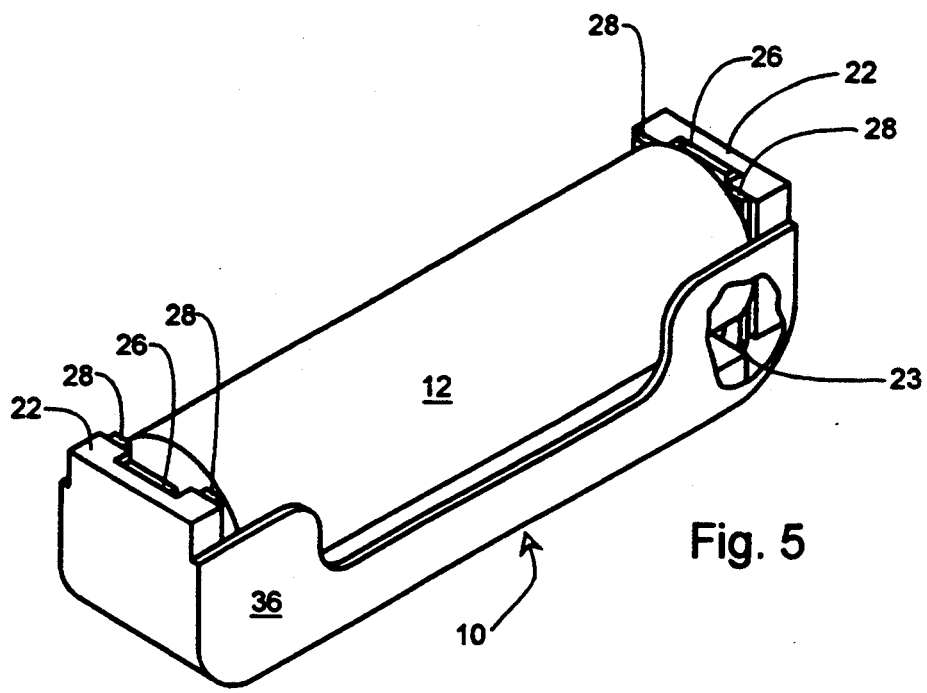
FIG. 5 is a figure similar to that of FIG. 2 showing an alternative arrangement of the alignment flanges for aligning the battery when it is positioned in the battery holder.

Referring now to FIG. 1 and 5, the restraining friction between the conductors 28 and 26 and the respective terminals 14 and 16 of the battery may be increased, and electrical contact ensured, by mounting at least one of the contact plates 22 with leaf springs 23 so that a slight flexure of the leaf springs allowing outward longitudinal movements of the contact plates 22 is required for the insertion of the battery 12 within the battery holder 10. This provides a compressive force on the battery 12 by the battery holder 10 when the battery 12 is in place.

This flexure may be accommodated and the alignment of the battery 12 within the frame 20 ensured by the addition of side flanges 36 extending longitudinally along either side of the frame 20 between the contact plates 22 to enclose the battery 12 within a rectangular, four sided tray. The height of the side flanges 36 may be reduced near the center of the frame 20 so as to permit easy removal and insertion of the battery 12 when grasped near its middle.

The side flanges 36 may be integrally molded with the frame 20 and one of the contact plates 22 so that the spring mounted contact plate 22 is unattached to the side flanges 36 ensuring free flexure of the leaf springs 23 providing the desired compression of the battery 12 between the contact plates 22.

Figure 4A:
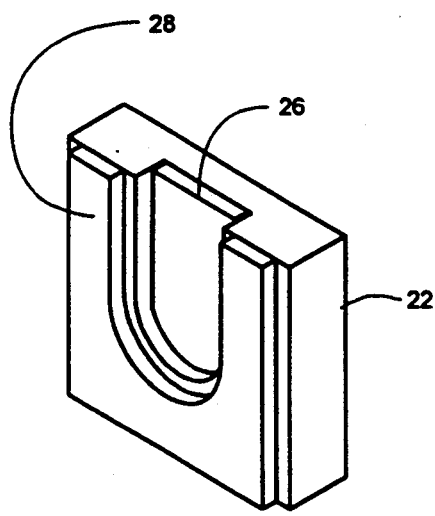
FIGS. 4a and 4b are perspective views of two alternate shapes of the contact plates of the battery holder of FIG. 1.
Figure 4B:
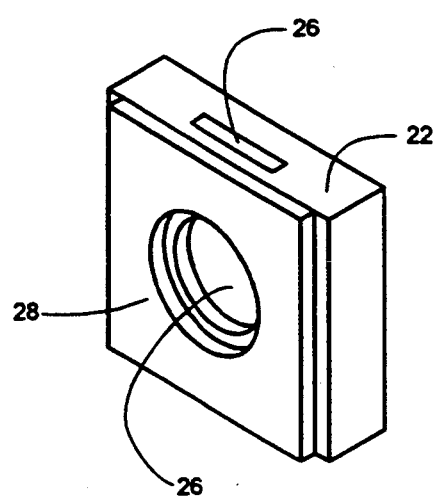

Referring to FIGS. 4a and 4b the contact plates 22 may be shaped so as to permit either transverse or axial insertion of the battery 12. As shown in FIG. 4a, conductor 28 is formed in a "U" shape to surround the conductor 26 on three sides and to permit axial motion of the button 18 of the battery (not shown) in between the arms of the "U". As shown in FIG. 4b, the conductor 28 is a square with a central circular opening centered on a disk-shaped exposed area of conductor 26. Here the button 18 of the battery 12 must be inserted axially and the contact plate 22 flexed outward by a sufficient amount to permit such axial insertion.

Figure 6:
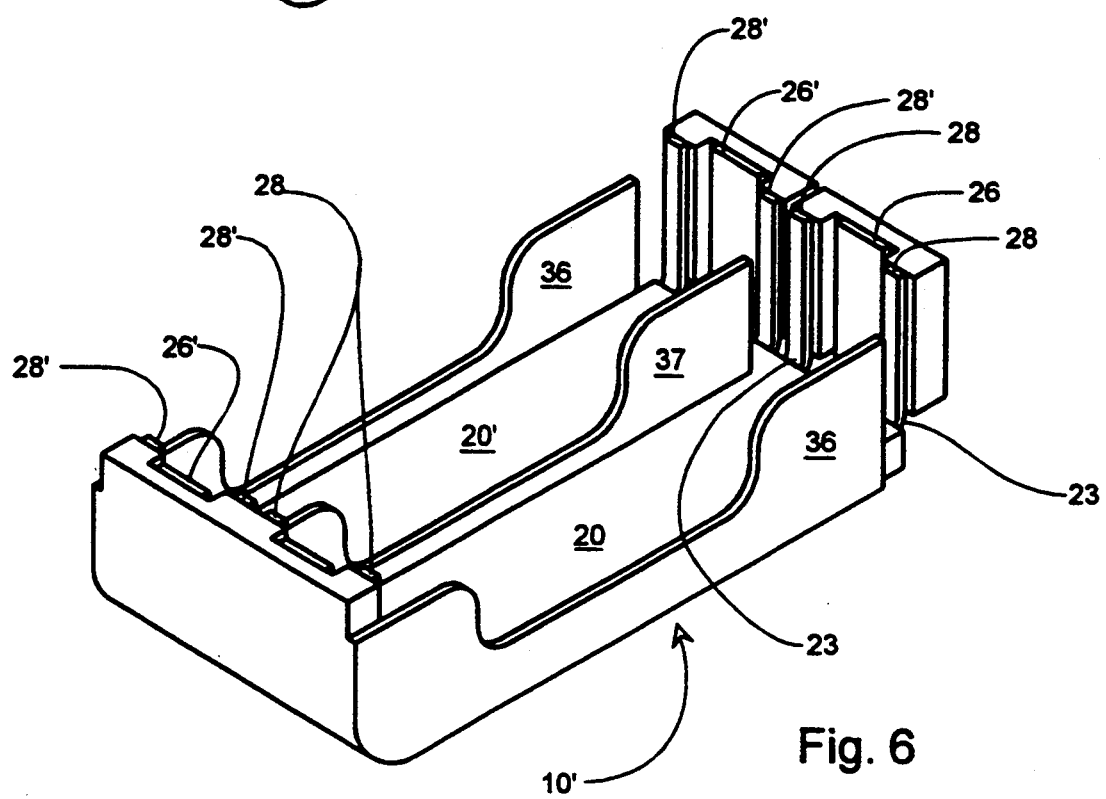
FIG. 6 is a figure similar to that of FIG. 2 showing an embodiment of the present invention for holding multiple batteries.
Figure 7:
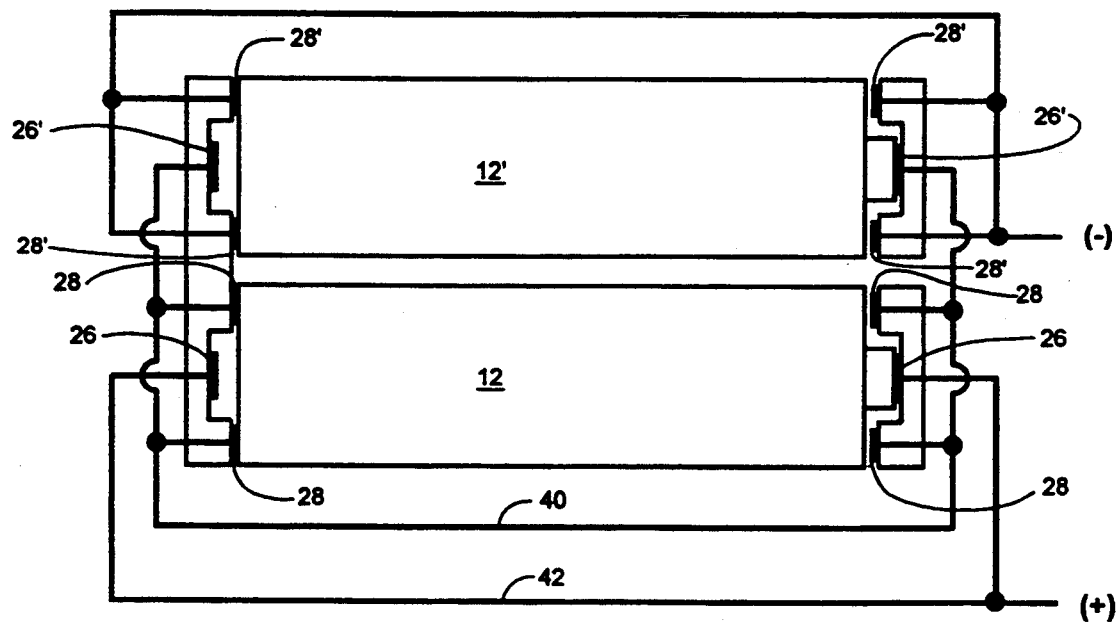
FIG. 7 is a figure similar to that of FIG. 3. showing a method of electrically connecting the battery holder of FIG. 6 so as to accommodate two batteries inserted in any of four combinations of directions.

Referring now to FIGS. 6 and 7 the invention provides important advantages in battery holders receiving multiple batteries. A two battery holder 10' holding a first battery 12 and a second battery 12' may be fashioned according to the above teachings by joining two of the battery holders 10 of FIGS. 1 or 5, along their longitudinal edges. In the case where the side flanges 36 of FIG. 5 are employed, a center flange 37 may be substituted for the side flanges 36 at the joined edge, the center flange 37 being substantially equal in dimension to side flanges 36 but somewhat shortened so as to not interfere with flexure of the contact plates 22 toward each other.

Electrically the conductors 26 and 28 associated with the first battery 12 and the conductors 26' and 28' associated with the battery 12' are joined together as before. That is conductors 28' are joined together, conductors 26' are joined together, conductors 28 are joined together, and conductors 26 are joined together. Conductors 28 and 28', and 26 and 26', however, are not necessarily joined together, but rather, if a series connection of the batteries 12 and 12' is desired, as shown in FIG. 7, conductors 28' are connected to conductors 26 by a wire 40, conductors 26' are connected to a positive lead 44 providing voltage to the attached circuit, and conductors 28 are connected to a negative lead 42 providing voltage to the circuit.

If parallel connection of the batteries 12 and 12' is desired, conductors 28 and 28, are joined to the negative lead 42 and conductors 26 and 26' are joined together by the positive lead. There is no conductor 40 in this case.

In either case, the battery holder of the present invention, connected as described, will accommodate any combination of insertion directions of the batteries 12 and 12' while still ensuring that the same voltage amplitude will be supplied to the attached circuitry and that the same polarity of voltage will be supplied to the attached circuitry. For two batteries 12 and 12' there are four possible ways to install the batteries within the holder 10' all of which provide the same voltage. In contrast, only one of the four combinations will work in a conventional multi-battery battery holder.

This above described concept may be readily expanded to more than two batteries with correspondingly increased benefits. For example, with a four battery battery holder there will be sixteen different possible ways of installing the batteries. The present invention allows each of these combinations to work.

While this invention has been described with reference to particular embodiments and examples, other modifications and variations, such as application to projection reconstruction imaging techniques, will occur to those skilled in the art in view of the above teachings. Accordingly, the present invention is not limited to the preferred embodiment described herein, but is instead defined in the following claims.

I claim:

1. A holder for an electrical battery having a first and second terminal separated by a battery length, the first terminal being a conductive button extending from the battery, and the second terminal being a conductive plate, the holder comprising:

a frame;

a first and second contact plate attached to the frame to present first and second opposed faces, respectively, the faces separated substantially by the battery length to define between them a battery space that may receive the battery in an aligned position with the terminals of the battery adjacent to the first and second opposed faces;

a first and second conductor exposed on the first and second face, respectively, one of the first and second conductors to contact the conductive button of the first terminal when the battery is in the aligned position; and a third and fourth conductor, insulated from the first and second conductors, and exposed on the first and second face, respectively, aside the first and second conductors and extending further from the first and second faces than the first and second conductors, one of the third and fourth conductors to contact the second terminal when the battery is in the aligned position.

2. The holder as recited in claim 1 wherein the third and fourth conductors extend further than the first and second conductors by a distance substantially less than the amount of the distance that the conductive button extends from the battery;

wherein the third and fourth conductors do not touch the battery surface surrounding the conductive button.

3. The holder as recited in claim 1 wherein the first and second conductors are joined to provide a first polarity of electrical voltage and wherein the third and fourth conductors are joined to provide a second and opposite polarity of electrical voltage.

4. The holder as recited in claim 1 wherein the first and second opposed faces include recesses sized to admit the conductive button of the first terminal but not the conductive plate of the second terminal and wherein the first and second conductors are placed within the recesses.

5. The holder as recited in claim 4 wherein the recesses are slots extending across the first and second faces to permit the battery to be inserted in the holder by passing the conductive button along the slot and wherein the first and second conductors are strips affixed to the bottom of the slot and wherein the third and fourth conductors are bifurcated each having two strips flanking each slot.

6. The holder as recited in claim 5 wherein the first and second conductors are leaf springs so that the battery when placed in the battery space is biased toward the face adjacent to the conductive plate of the battery's second terminal.

7. A holder for at least two electrical batteries each having a first and second terminal separated by a battery length, the first terminal being a conductive button extending from the battery, and the second terminal being a conductive plate, the holder comprising:

a frame;

a first and second contact plate attached to the frame to present first and second opposed faces, respectively, the faces separated substantially by the battery length to define between them a battery space that may receive the batteries in aligned positions with the terminals of the batteries adjacent to the first and second opposed faces;

a first and second conductor exposed on the first and second face, respectively, one of the first and second conductors to contact the conductive button of the first terminal of a first battery when the first battery is in the aligned position;

a third and fourth conductor, insulated from the first and second conductors, and exposed on the first and second face, respectively, aside the first and second conductors and extending further from the first and second faces than the first and second conductors, one of the third and fourth conductors to contact the second terminal of the first battery when the first battery is in the aligned position;

a fifth and sixth conductor exposed on the first and second face, respectively, one of the fifth and sixth conductors to contact the conductive button of the first terminal of a second battery when the second battery is in the aligned position;

a seventh and eighth conductor, insulated from the fifth and sixth conductors, and exposed on the first and second face, respectively, aside the fifth and sixth conductors and extending further from the first and second faces than the fifth and sixth conductors, one of the seventh and eighth conductors to contact the second terminal of the second battery when the second battery is in the aligned position; and an electrical lead connecting the first and second conductors to the seventh and eighth conductors.

* * * * *